July 28, 1942.  B. L. BRAGG, 3D  2,291,448
SHIELDED HIGH VELOCITY THERMOCOUPLE
Filed Oct. 28, 1939  2 Sheets-Sheet 1
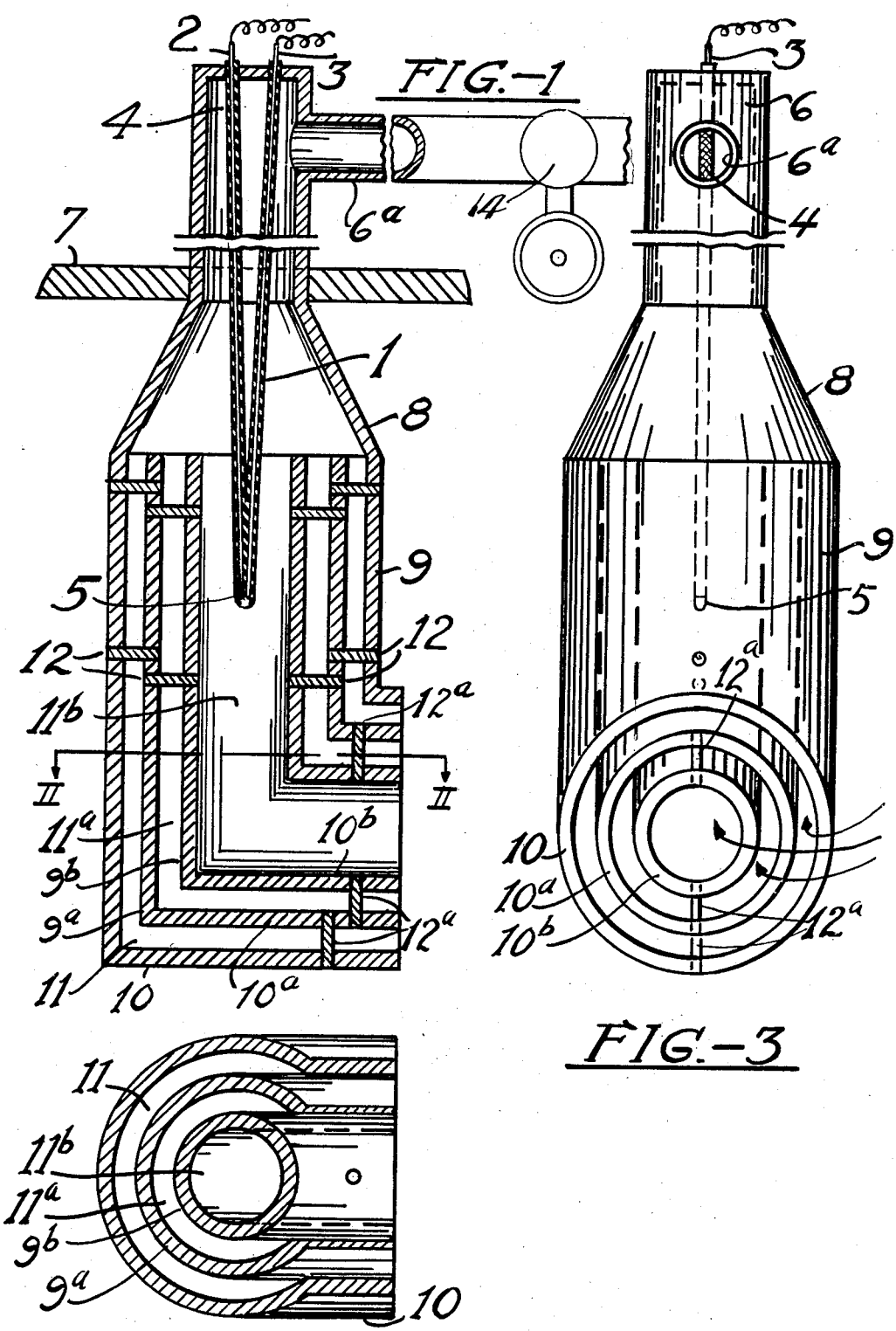

July 28, 1942.  B. L. BRAGG, 3D  2,291,448
SHIELDED HIGH VELOCITY THERMOCOUPLE
Filed Oct. 28, 1939   2 Sheets-Sheet 2

Benjamin L. Bragg Inventor

Patented July 28, 1942

2,291,448

UNITED STATES PATENT OFFICE 2,291,448

SHIELDED HIGH VELOCITY THERMOCOUPLE

Benjamin L. Bragg, III, Elizabeth, N. J., assignor to Standard Oil Development Company, a corporation of Delaware Application October 28, 1939, Serial No. 301,791

3 Claims. (Cl. 73—355)

The present invention relates to a thermocouple apparatus, and more particularly to a shielded thermocouple structure. It is an object of the invention to provide a means for measuring the temperature of hot gases in the radiant section of a furnace, while avoiding the usual effect of radiant heat on such measurements. It is also an object of the invention to provide means whereby the hot gases themselves may be utilized as an insulating medium in the thermocouple apparatus.

These and other objects may be fully understood from the following specification when it is read in conjunction with the accompanying drawings, in which Fig. 1 is a view of the apparatus in vertical section;

Fig. 2 is a view of the apparatus, in horizontal section, taken along the line II—II of Fig. 1;

Fig. 3 is a side elevation looking toward the entrance for hot gases; and

Figure 4:
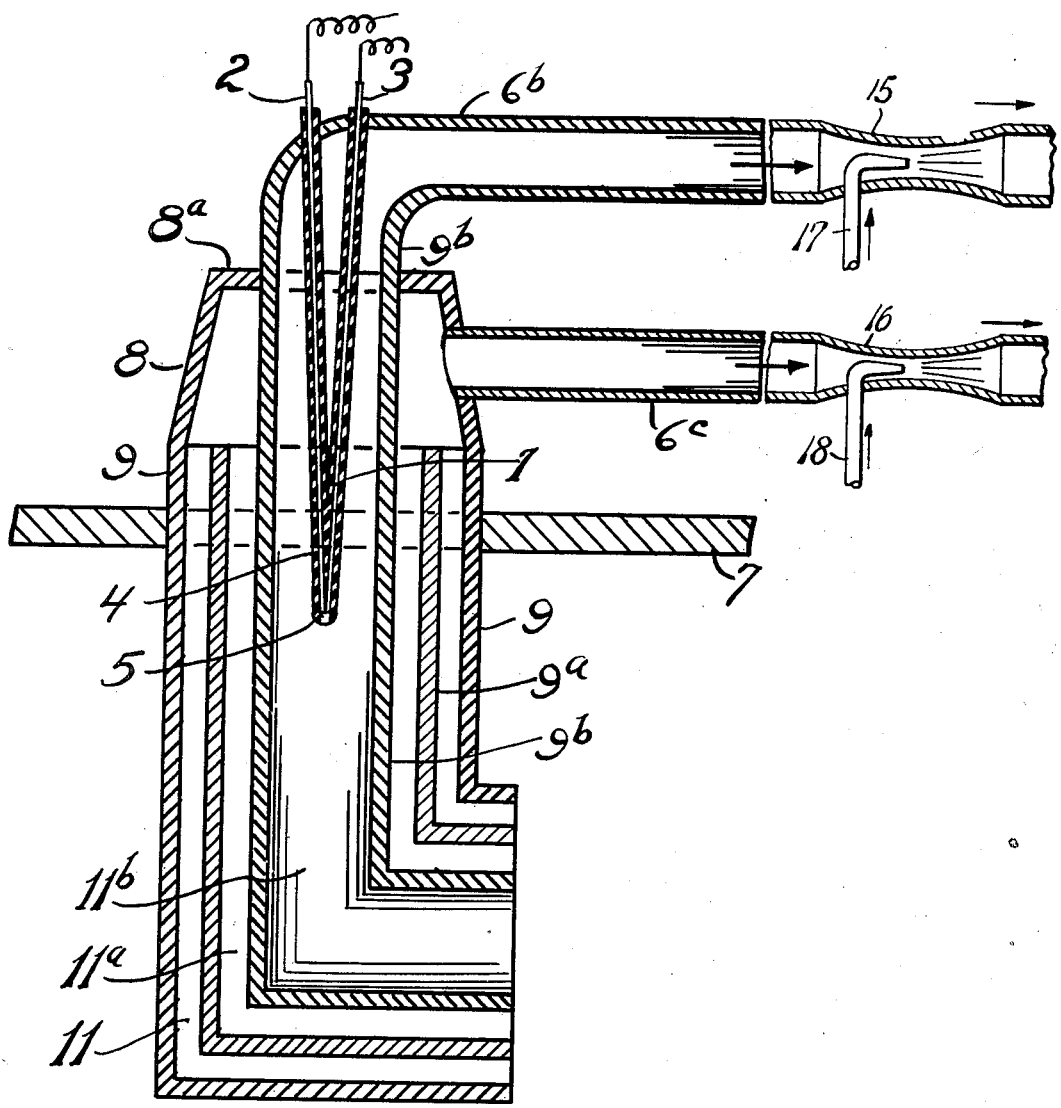
Fig. 4 is a vertical section through another form of the apparatus.

Referring to the drawings, and particularly to Figs. 1 to 3 inclusive, the numeral 1 designates a two wire thermocouple in which the wires 2 and 3 are protected by an insulating material 4, the wires extending therethrough to provide a union 5 which is to be disposed in contact with a stream of hot fluid. The insulated wires are supported in fluid-tight relation to a cap member 6, which in turn is held in fluid and pressure-tight relation to the wall 7 of a chamber or vessel in which are the gases or other fluids to be temperature tested.

The cap member 6 provided with a suction fitting 6a, extends into the chamber as indicated, and with the conical reducer element or hood 8 and the tubular member or body portion 9, provide the outer wall of the thermocouple shield. The member 9 as shown, is formed with a biased or angular end to which has been secured a matching section 10 providing a substantially L-shaped passageway 11 opening laterally into the path of the hot gases.

Within the outer tubular member 9, similar members 9a and 9b are concentrically disposed, each having a matching section 10a and 10b. In this fashion a series of concentric passageways 11, 11a and 11b are formed. The inner tubular members 9a and 9b may be maintained in their desired concentric relation to one another and to the member 9, in any convenient fashion. As shown, they are assembled and maintained in position by means of a plurality of pins 12 and 12a, irregularly disposed between tubular members. The use of pins is preferred as a means to reduce transfer of heat by conduction from the outer tube 9 to the innermost tube 9b.

As illustrated, the cap member 6 is provided with a side arm 6a through which the interior of the thermocouple shield may be connected to a suction pump 14 or other convenient means for producing a high velocity flow of hot fluid or gas through the passageways 11, 11a and 11b. It is contemplated that, in the apparatus shown, the spacing of the tubes, and the size of the passageways so formed will be such as to produce substantially equal pressure drop through each one, and thereby obtain a substantially equivalent high velocity effect through each of the passageways. It is contemplated, however, that under certain circumstances, it may be desirable to vary the pressure drop from one passage to another, and in such instance, the relationship between the several passages may be altered in any desired fashion, as by reducing or increasing the cross-sectional area of one or more of the passageways.

In addition, as illustrated in Fig. 4, it may be found desirable to provide for withdrawing fluids through the enclosed zone of the device by separate lines. In the form of the device shown, the body portion 9 extends outwardly through the wall 7, and is provided with a conical hood 8 having an annular closure 8a through which the tubular member 9b is extended into connection with a suction pipe 6b. The concentric passages 11 and 11a are served, through the hood member 8, by means of the suction pipe 6c connected therewith. Said suction pipes 6b and 6c are connected to any suitable suction-producing means, such as steam eductors 15 and 16, into which steam is introduced through jets 17 and 18, respectively. In this fashion, any suitable arrangements may be made for withdrawing the stream of fluid in contact with the heat sensitive element at a different rate than other fluid, also passing through the enclosed zone of the device, but out of contact with the heat sensitive element.

The instrument, as described, is intended to be placed in path of a stream of fluid to be temperature tested, with the inlet end facing up stream. Suction is then applied to the device, and a flow of gas at high velocity caused to pass through the tube. Due to its high velocity, the gas flowing through the outer passage 11, while heated by radiation through the outer passage walls, will produce a high conduction heat transfer effect, and tend to make the tubular member proach the true gas temperature. Similarly, the gas flowing through the passage 11a will also tend to reduce the total effect of radiant heat on the shield, so that the gas flowing through the innermost passage 11b should demonstrate its true temperature. Furthermore, by reason of the angular form of the device, the thermocouple is adequately shielded from the direct effect of radiant heat which might ordinarily enter through the open end of the tube, thus overcoming or avoiding the condition in which the thermocouple might "see" through the tube end.

Various alterations and changes may be made in the structure as described, for the purpose of illustration, and it is not intended that the scope of the invention shall be limited by such description, but only by the appended claims.

I claim:

1. In a heat responsive apparatus, a heat responsive element, radiant heat-shielding means therefor, comprising concentric spaced tubes disposed longitudinally with respect to said heat responsive element, whereby the element is protected from all lateral radiant heat, angular extensions at the fluid intake end of said tubes and extensions at the other end of said tubes protecting the element from all other sources of radiant heat and means for passing the fluid to be temperature tested at high velocity through said concentric tubes and in contact with said heat responsive element.

2. Apparatus according to claim 1, in which the spaced tubes are of substantially L-shape.

3. In combination with the wall of a structure within which radiant heat is being generated and which contains a fluid the temperature of which is to be measured, a temperature measuring device comprising an outer shield member within the structure, a suction fitting outside the structure and connected in fluid-tight relation to said shield member, a plurality of spaced concentric members of generally tubular form within said shield member forming parallel concentric passageways, said shield and spaced concentric members each being angularly offset forming a second series of parallel concentric passageways communicating with and extending angularly to the first mentioned passageways, all of said second series of passageways opening into said structure, a thermocouple positioned within the innermost of said first mentioned passageways and shielded from radiant heat by said offset shield and concentric members, and means connected with the suction fitting for drawing the fluid through all said passageways.

BENJAMIN L. BRAGG, III.